Nov. 6, 1962    R. L. JACKMAN    3,062,252
INTERLOCKING WASHER AND NUT
Filed Jan. 6, 1958
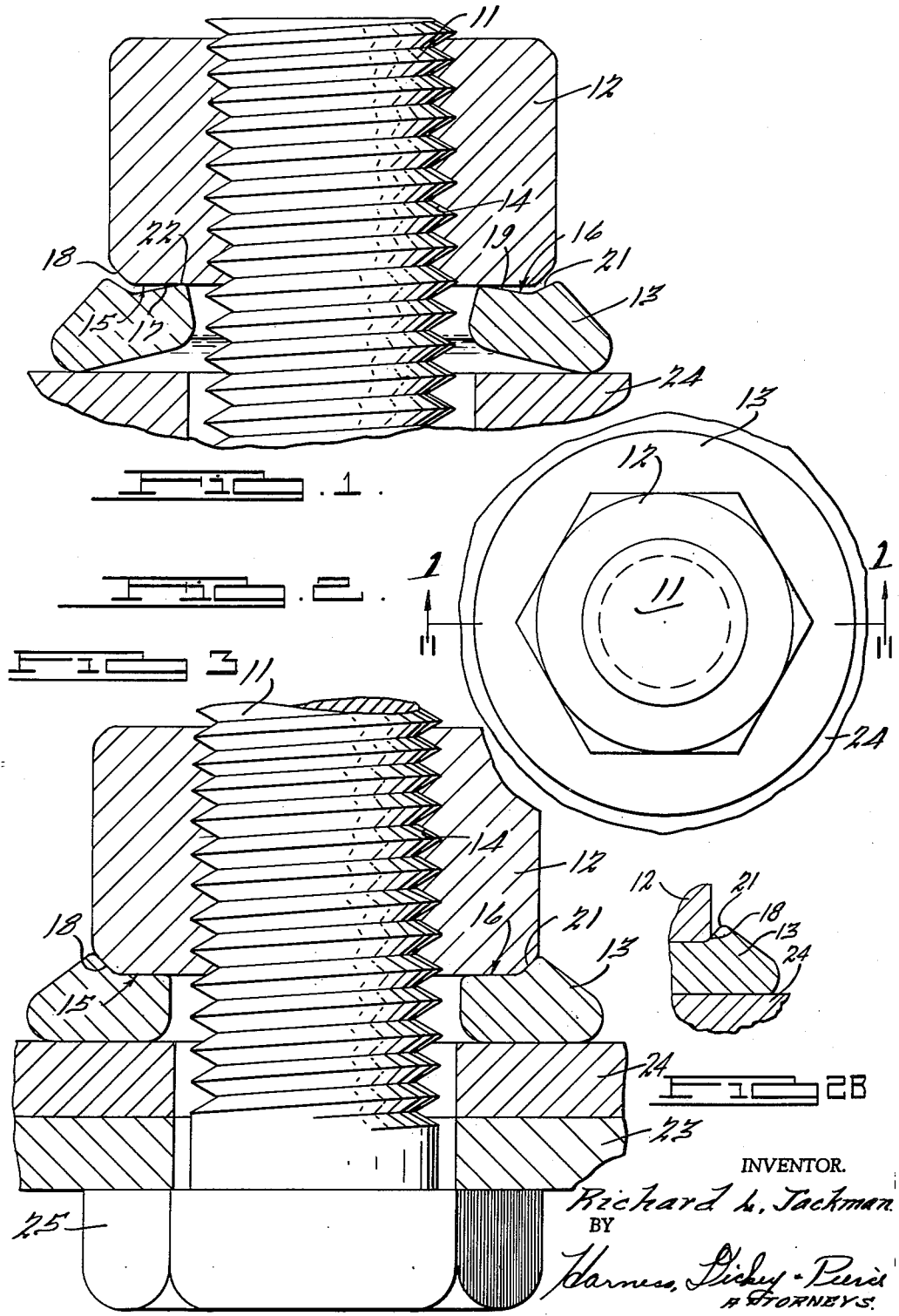
INVENTOR.
Richard L. Jackman
BY
Harness, Dickey & Pierce
ATTORNEYS

United States Patent Office 3,062,252
Patented Nov. 6, 1962

3,062,252
INTERLOCKING WASHER AND NUT
Richard L. Jackman, New Castle, Ind., assignor to Knocke & Associates, Inc., Birmingham, Mich., a corporation of Michigan
Filed Jan. 6, 1958, Ser. No. 707,279
3 Claims. (Cl. 151—38)

This invention relates to threaded fasteners, and more particularly to washer and nut combinations used in conjunction with threaded bolts or studs for fastening parts.

It is an object of the invention to provide an improved washer and nut combination which will prevent undesired spreading of the nut due to its coaction with the bolt threads when the nut is being tightened or is fully taken up, thus permitting the use of a standard thin-walled nut with a subsequent reduction in diameter and saving of metal, and without lessening the torque or axial load to which the nut may be subjected.

It is a further object to provide an improved washer and nut combination of this type which eliminates the need for finished end surfaces on the nut, thus saving in machining costs.

It is another object to provide a washer and nut combination in which either flat or lock washers may be utilized and which will provide an advantageous stress distribution when coned lock washers are used, preventing unduly high stress concentrations.

It is also an object to provide an improved washer and nut combination of this character which enables the washer to be efficiently mass produced with a desirable grain flow in the washer cross section.

Other objects, features and advantages of the present invention will become apparent from the subsequent description, taken in conjunction with the accompanying drawings.

In the drawings:

FIGURE 1 is an elevational view in cross section of a preferred form of the novel washer and nut combination which utilizes a lock washer of the coned type, the parts being shown in their unstressed position, the section being taken along the line 1—1 of FIGURE 2.

FIGURE 2 is a plan view of the assembly shown in FIGURE 1;

FIGURE 2a is a fragmentary perspective view of the lower end of the nut showing the outwardly inclined surface portion thereof;

FIGURE 2b is a fragmentary cross-sectional view taken along the line 2b—2b of FIGURE 2 and showing the mutually engaging nut and washer surfaces at the center of a nut flat when the unit is tightened;

FIGURE 3 is a sectional view in elevation similar to FIGURE 1 but showing the parts in stressed position with a fastening bolt.

Referring to the embodiment of FIGURES 1 to 3, the invention is adapted for use in conjunction with a threaded fastener 11 which may be a stud or bolt and which is adapted to fasten parts together in the usual manner. An internally threaded standard thin-walled nut 12 is provided in conjunction with bolt 11, and a washer 13, which for purposes of the invention may be either a plain or lock washer, is likewise mounted on the bolt. In the embodiment of the invention illustrated in FIGURES 1 to 3, washer 13 is shown as a coned lock washer of the type which is flattened against the work when nut 12 is taken up to provide a frictional resistance which prevents backing off of the nut. Means are provided, according to the invention, for creating an interlocking action between nut 12 and washer 13 when the nut is taken up, this interlocking action being such as to create resistance against the tendency of nut 12 to spread when full torque is applied. It will be understood that, due to the forces imposed on nut 12 when it is tightened, surfaces 14 at the lower end of the nut thread will tend to be spread apart, thus decreasing the total area of contact between the nut and bolt threads. The present invention provides interlocking surfaces between the lower end of the nut and the washer which prevent such spreading action from taking place, these surfaces being generally indicated at 15 and 16 respectively in the embodiment of FIGURES 1 to 3. As best seen in FIGURE 1, nut surface 15, which is of conventional shape, comprises a flat portion 17 and an outer inclined or chamfered portion 18 facing away from the nut axis.

Surface 16 on washer 13 faces nut surface 15 and has a flat portion 19 adapted to engage nut surface portion 17 and an inwardly sloping outer portion 21 for cooperation with nut surface portion 18. It should be noted that, in the undeformed condition of the parts, inner edge 22 of washer surface portion 19 will be closer nut surface portion 17 than will the outer region of portion 19. This is because flattening of washer 13 when nut 12 is taken up will cause deformation of surface 16 such that the corresponding portions of surfaces 15 and 16 will be interlocked.

The operative condition of the parts is shown in FIGURE 3, which illustrates the use of bolt 11 for fastening together two structural members 23 and 24. Head 25 of bolt 11 is on one side of member 23 while nut 12 and washer 13 are threaded on bolt 11 on the outer surface of member 24. As nut 12 is tightened, it will cause flattening of washer 13 until the position shown in FIGURE 3 is attained. Flattening of washer 13 will cause surfaces 15 and 16 to become interlocked, and the cooperating surface portions 18 and 21 will prevent spreading of nut 12 which might otherwise occur. More specifically, radial force components exerted by surface portion 18 of nut 12 on surface portion 21 of washer 13 will be resisted by the washer, the surfaces being in mutual contact when washer 13 is flattened. It should be noted that this coaction between the washer and nut will in no way interfere with the normal locking function of washer 13 due to the axial force which it exerts in its deformed condition on nut 12.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a washer for use in combination with an internally threaded nut having a washer-facing end surface with a flat inner portion and an uninterrupted annular outwardly inclined portion surrounding said flat portion, an uninterrupted annular member having when in its operative condition a flat surface for engagement with a part to be fastened, a flat inner surface portion on the other side of said washer parallel to said first flat surface, and an uninterrupted annular inwardly inclined surface portion on said washer surrounding said last-mentioned flat inner surface portion and complementary in shape to said outwardly inclined nut surface portion, the outer diameter of said inclined washer surface portion being less than the outer diameter of said flat part-engageable washer surface, the relative positions of said surfaces being such that tightening of said nut will cause simultaneous engagement of said flat nut surface portion with said flat inner washer surface portion and of said outwardly inclined nut surface portion with said inwardly inclined washer surface portion, whereby said washer and nut will be interlocked to resist spreading of the nut thread turns adjacent said washer.

2. The combination according to claim 1, further provided with an annular concave recess on said washer between said flat inner surface portion and said inwardly inclined surface portion, and a convex annular portion complementary to said concave recess on said nut between said flat surface portion and said outwardly inclined surface portion.

3. The combination according to claim 1, said annular member being of coned configuration in its unstressed condition.

References Cited in the file of this patent

UNITED STATES PATENTS

| | | |
|---|---|---|
| 970,101 | Omalia | Sept. 13, 1910 |
| 1,365,775 | Eisele | Jan. 18, 1921 |
| 1,404,296 | Howard | Jan. 24, 1922 |
| 1,793,453 | Barili | Feb. 24, 1931 |
| 2,361,814 | Berry | Oct. 31, 1944 |
| 2,520,259 | Pummill | Aug. 29, 1950 |
| 2,588,372 | Erb | Mar. 11, 1952 |

UNITED STATES PATENT OFFICE
CERTIFICATE OF CORRECTION

Patent No. 3,062,252            November 6, 1962

Richard L. Jackman

It is hereby certified that error appears in the above numbered patent requiring correction and that the said Letters Patent should read as corrected below.

Column 4, after line 10, add the following

FOREIGN PATENTS 24,791      France---------------- Apr. 26, 1921

Signed and sealed this 30th day of July 1963.

(SEAL)
Attest:

ERNEST W. SWIDER            DAVID L. LADD
Attesting Officer            Commissioner of Patents